(12) United States Patent
Wang et al.

(10) Patent No.: US 11,387,898 B2
(45) Date of Patent: Jul. 12, 2022

(54) DISTRIBUTED SENSING OVER SWITCHED OPTICAL FIBER NETWORKS

(71) Applicant: NEC Laboratories America, Inc., Princeton, NJ (US)

(72) Inventors: Ting Wang, West Windsor, NJ (US); Ming-Fang Huang, Princeton, NJ (US); Yaowen Li, Princeton, NJ (US); Philip Ji, Princeton, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/035,551

(22) Filed: Sep. 28, 2020

(65) Prior Publication Data
US 2021/0266065 A1 Aug. 26, 2021

Related U.S. Application Data

(60) Provisional application No. 63/006,233, filed on Apr. 7, 2020, provisional application No. 62/980,527, filed on Feb. 24, 2020.

(51) Int. Cl.
*H04B 10/079* (2013.01)
*G01D 5/353* (2006.01)

(52) U.S. Cl.
CPC ..... *H04B 10/0791* (2013.01); *G01D 5/35358* (2013.01)

(58) Field of Classification Search
CPC .......... H04B 10/0791; G01D 5/35358
See application file for complete search history.

(56) References Cited

U.S. PATENT DOCUMENTS

| | | | |
|---|---|---|---|
| 5,623,565 A * | 4/1997 | Blair | G01D 5/268 398/67 |
| 9,772,238 B2 * | 9/2017 | Preston | G01L 1/242 |
| 10,931,366 B2 * | 2/2021 | Wang | G01D 5/35364 |
| 11,199,465 B2 * | 12/2021 | Crickmore | G01D 5/35361 |
| 2012/0222487 A1 | 9/2012 | Hill et al. | |
| 2019/0025095 A1 | 1/2019 | Steel et al. | |

* cited by examiner

*Primary Examiner* — Seung C Sohn
(74) *Attorney, Agent, or Firm* — Joseph Kolodka

(57) ABSTRACT

Aspects of the present disclosure describe optical fiber sensing systems, methods and structures disclosing a distributed optical fiber sensor network constructed on a switched optical fiber telecommunications infrastructure to detect temperatures, acoustic effects, and vehicle traffic—among others—demonstrated with a number of different network topologies.

9 Claims, 12 Drawing Sheets

Backscattering for applications

- Raman: temperature
- Brillouin: temperature and strain
- Rayleigh: vibration/acoustic

DISTRIBUTED SENSING OVER SWITCHED OPTICAL FIBER NETWORKS

CROSS REFERENCE

This disclosure claims the benefit of U.S. Provisional Patent Application 62/980,527 filed Feb. 24, 2020 and 63/006,233 filed Apr. 7, 2020, the entire contents of each is incorporated by reference as if set forth at length herein.

TECHNICAL FIELD

This disclosure relates generally to optical communications and optical sensing systems, methods and structures. More particularly, it describes distributed optical fiber sensing systems, methods, and structures and application thereof on switched optical fiber telecommunications facilities.

BACKGROUND

As is known in the optical sensing and communications arts, distributed optical fiber sensing involves several related technologies in which an interrogator—generally located within a station—actively generates optical signals, introduces them into an optical fiber, and subsequently detects reflected signals originating along a length of the fiber. Such reflections may originate—for example—as a result of changing environmental conditions that the fiber and/or sensors positioned along its length experience. As such, the optical fiber conveys—via reflected signal(s)—environmental/sensory data back to the interrogator where—using signal processing techniques—the interrogator determines/derives valuable information about environmental conditions along the length of the fiber.

As currently implemented, distributed fiber optic sensing (DFOS or DFS) finds widespread applicability in such diverse applications as infrastructure monitoring, intrusion detection, and environmental monitoring—including earthquake detection.

Contemporary telecommunications carriers have constructed huge-scale optical fiber infrastructures to support incalculable volumes of telecommunications data traffic including that associated with the Internet. Until now, these optical fiber infrastructures have only been used to convey such telecommunications data.

SUMMARY

An advance in the art is made according to aspects of the present disclosure directed to systems, methods, and structures providing distributed fiber optic sensing over switched optical fiber networks carrying live, high-speed telecommunications signals.

In sharp contrast to the prior art, systems, methods, and structures according to aspects of the present disclosure advantageously employ contemporary switched optical telecommunications networks to serve as distributed fiber sensing platforms that may advantageously simultaneously convey live, high-speed telecommunications signals representing the telecommunications data as well as distributed fiber optic sensing (DFOS) signals representing environmental conditions of the optical fiber.

Leveraging Rayleigh and Raman backscattering, systems, methods, and structures according to aspects of the present disclosure allow related physical properties—such as vibration, temperature and acoustic effects—to be sensed at every point along the entire optical fiber cable.

By using multiple DFOS systems and optical switches, network-wise sensing features operating over star, ring, mesh, and flexible network topologies may be employed. Moreover, by using a novel 4-channel DFOS system simultaneous detection over multiple routes is enabled.

BRIEF DESCRIPTION OF THE DRAWING

A more complete understanding of the present disclosure may be realized by reference to the accompanying drawing in which:

FIG. 4(A) is an architecture layout of a distributed switched sensor network testbed in a meshed network topology over an existing communications network and FIG. 4(B) is a series of waterfall trace plots showing vehicle traffic detection in the mesh network of FIG. 4(A) while

FIG. 6(A) is an architecture layout of a distributed sensor network testbed in a flexible network topology over an existing communications network and FIG. 6(B) is a series of plots showing acoustic effects (car passing and horn actuated) while

Figure 1A:
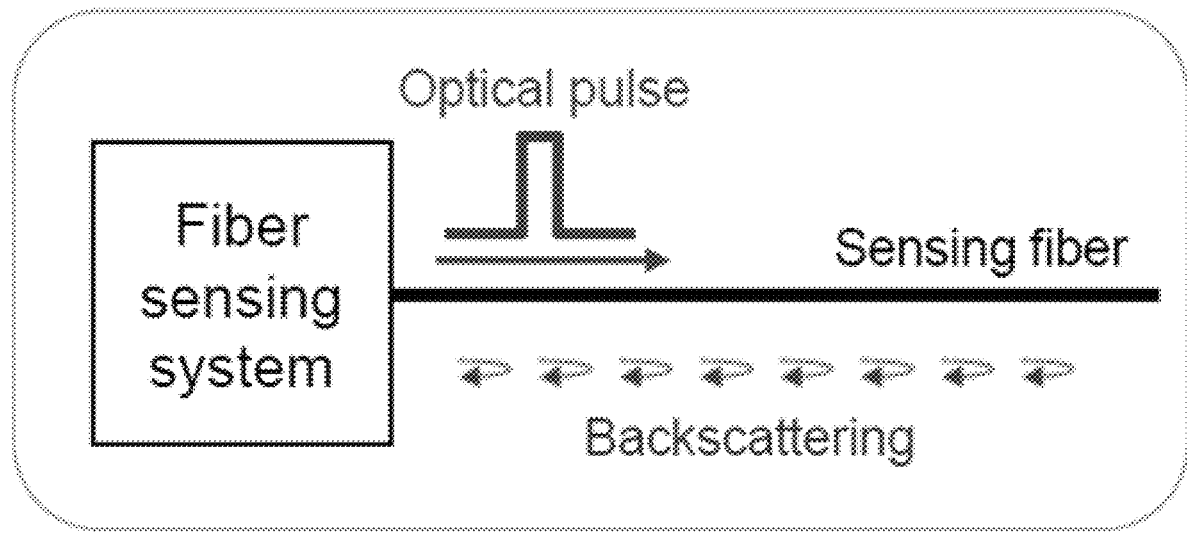
FIG. 1(A) shows a schematic diagram of an illustrative optical fiber sensing arrangement and types of backscatter employed for various applications according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting once more that distributed fiber sensing generally describes systems and methods that include an interrogator system—conveniently and/or centrally located inside a station—which actively generates optical signals, introduces those signals into an optical fiber, and subsequently detects reflected (backscattered) signals that originate along the fiber. Operationally, such fiber acts as a passive link that passes or otherwise conveys environmental information back to the interrogator via the reflected signal(s). By processing the reflected/received signal(s), the interrogator derives information about the environmental conditions along the entire fiber.

In contrast, modern fiber optical telecommunications systems, methods, and structures generally include an optical transmitter to convert an electrical signal into an optical signal to send through the optical fiber, a cable containing bundles of multiple optical fibers that is routed through underground conduits, buildings, and other structures, multiple kinds/types of amplifiers, and an optical receiver to recover the signal as an electrical signal. Telecommunications data transmitted typically includes digital data generated by computers, telephone systems, television/video/other data that when received by an appropriate system, may derive useful items of informational value, i.e., programs, speech, file(s), etc.

The most commonly used optical transmitters are semiconductor devices such as light emitting diodes (LEDs) and laser diodes. The difference between LEDs and laser diodes is that LEDs produce incoherent, while laser diodes produce coherent. For use in optical communications, semiconductor optical transmitters must be designed to be compact, efficient and reliable, while operating in an optimal wavelength range and directly modulated at high frequencies.

The main component of an optical receiver is a photodetector which may Convert light into electricity using the photoelectric effect. The primary photodetectors for telecommunications are made from indium Gallium Arsenide. The photodetector is typically a semiconductor-based photodiode. Several types of photodiodes include p-n photodiodes, p-i-n photodiodes, and avalanche photodiodes. Meal-Semiconductor-Metal (MSM) photodetectors are also used due to their suitability for circuit in regenerators and wavelength-division multiplexers.

Optical-electrical converters are typically coupled with a transimpedance amplifier and a limiting amplifier to produce a digital signal in the electrical domain from the incoming optical signal, which may be attenuated and distorted while passing through the channel. Further signal processing such as clock recovery from data (CDR) performed by a phase-locked loop may also be applied before the data is passed on.

Coherent receivers (used in conjunction with coherent transmitters or combined transmitter/receivers—transceivers) use a local oscillator laser in combination with a pair of hybrid couplers and four photodetectors per polarization, followed by high speed ADCs and digital signal processing to recover data modulated with QPSK, QAM, or OFDM.

Generally, an optical telecommunications transmitter includes a digital-to-analog (DAC), a driver amplifier and a Mach-Zehnder-Modulator (MZM). The deployment of higher modulation formats (>4QAM) or higher Baud rates (>32 GBaud) diminishes the system performance due to linear and non-linear transmitter effects. These effects can be categorized in linear distortions due to DAC bandwidth limitation and transmitter I/Q skew as well as non-linear effects caused by gain saturation in the driver amplifier and the Mach-Zehnder modulator. Digital predistortion counteracts the degrading effects and enables Baud rates up to 56 GBaud and modulation formats like 64QAM and 128QAM with the commercially available components. The transmitter digital signal processor performs digital predistortion on the input signals using the inverse transmitter model before uploading the samples to the DAC.

Older digital predistortion methods only addressed linear effects. Recent publications also compensated for non-linear distortions. More particularly, some models treat the Mach-Zehnder modulator as an independent system and the DAC and the driver amplifier are modelled by a truncated, time-invariant Volterra series, while other techniques use a memory polynomial to model the transmitter components jointly.

We present this additional telecommunications background to further differentiate telecommunications traffic from distributed fiber sensing data as those are use herein. Such telecommunications traffic and data will employ a transmitter at one end of an optical fiber link and a receiver at another, different end of the optical fiber link to effect the telecommunications traffic transmission/reception. In contrast, our distribute sensing traffic (optical sensing pulses) is generally sent from one end of the optical fiber employed and backscattered to that same end. Also, such distributed sensing data is of a sensory nature, and not of a more general nature, i.e., eMail, file sharing, video, voice, streaming data traffic, etc., as noted above.

FIG. 1(A) shows a schematic diagram of an illustrative optical fiber sensing (distributed fiber sensing) arrangement and types of backscatter employed for various applications according to aspects of the present disclosure. As may be observed from that figure, different types of backscattering may be preferably employed for different applications. More specifically, Raman backscattering may be employed for temperature sensing application(s), Brillouin backscattering for temperature and/or strain sensing application(s), and Rayleigh backscattering for vibration and/or acoustic sensing application(s).

Advantageously, such distributed fiber optic sensing (DFS) systems may be deployed in wide range of applications such as infrastructure monitoring including bridges, highways, and buildings, intrusion detection, and environmental monitoring including earthquake detection.

As such distributed fiber optic sensing (DFS) systems may be deployed in wide range of applications such as infrastructure monitoring including bridges, highways, and buildings, intrusion detection, and environmental monitoring including earthquake detection will be readily appreciated by those skilled in the art, telecommunications carriers and service providers have installed vast quantities (excess of 3-4 million fiber cable miles in the US alone) of optical fiber dedicated to communications services. Such fiber may be located in underground conduits, located aerially on poles, and within buildings/communications towers, etc. As we shall show and describe, systems, methods, and structures according to aspects of the present disclosure may be advantageously employed to not only monitor/diagnose/locate operational faults within the fiber for curing telecommunications problems, but may be advantageously employed to provide other—non-telecommunications related sensor data—that may be used to derive additional valuable information as well—even while voluminous amounts of live telecommunications activity occurs in a same optical fiber.

As noted, one aspect of systems, methods, and structures according to aspects of the present disclosure is to monitor the "health"/condition of the optical fiber such that it may be diagnosed/maintained. Consistent with those aspects, we disclose using distributed temperature sensing (DTS) along existing telecommunications infrastructure to allocate fiber position and develop a model/understanding of characteristics of the optical fiber.

Figure 1B:
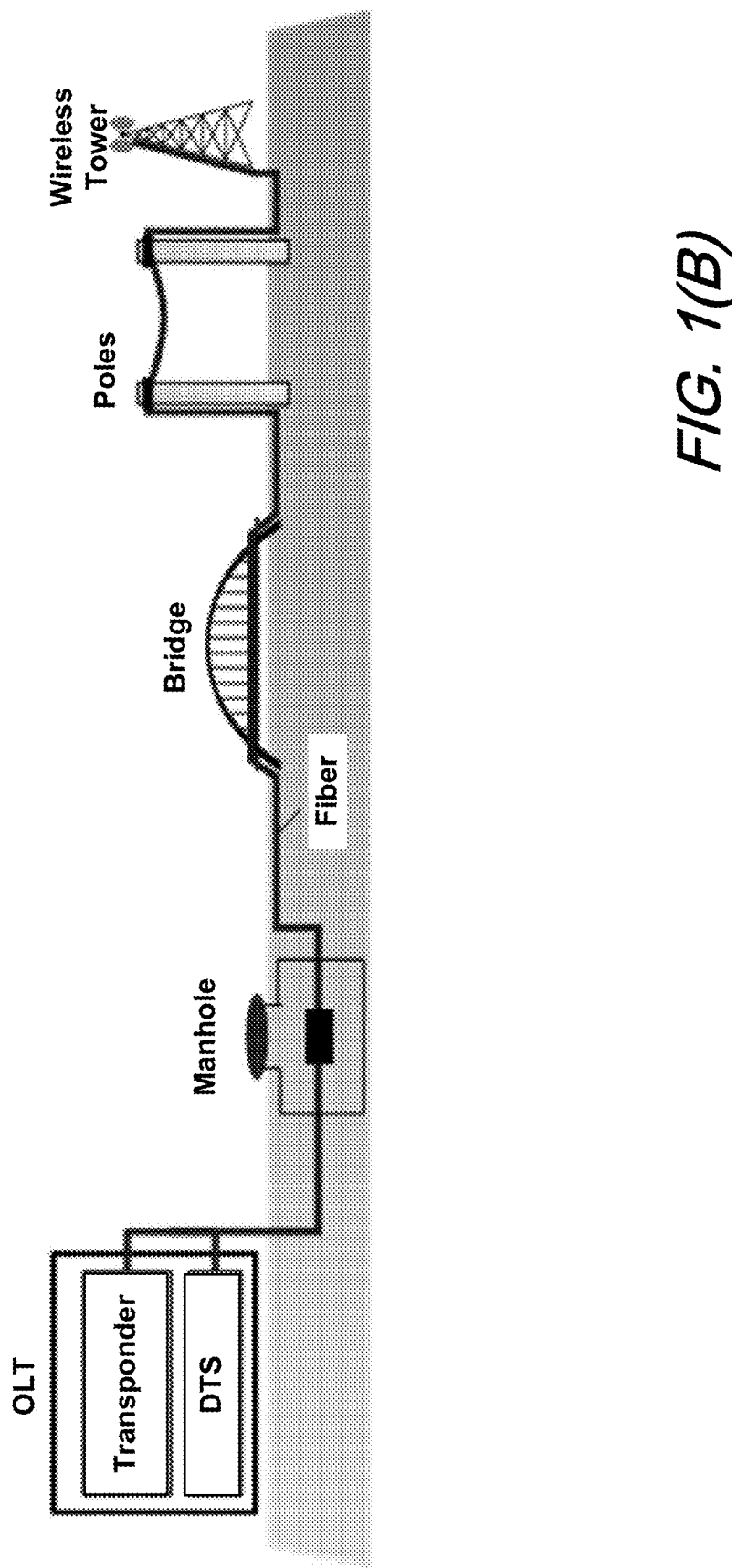
FIG. 1(B) shows a schematic diagram of an illustrative telecommunications optical fiber infrastructure and distributed fiber sensing arrangement employing temperature detection according to aspects of the present disclosure.

Turning now to FIG. 1(B), there is shown a schematic diagram of an illustrative telecommunications optical fiber infrastructure and distributed fiber sensing arrangement employing temperature detection according to aspects of the present disclosure. As shown in that figure, an optical line terminal (OLT) including a transponder and DTS, is optically interconnected with one or more manhole(s)/handhole(s), bridge(s), aerial pole(s), and wireless tower(s) via existing optical telecommunications fiber.

The DTS system provides temperature data/information for locations along the entire fiber infrastructure. For the purposes of this disclosure, two key locations along the optical infrastructure illustrated in the figure are manholes/handholes and aerial poles.

As we shall show and describe, systems, methods, and structures according to aspects of the present disclosure measure temperature distribution(s) along the fiber infrastructure to determine cable position(s) and an understanding of environment existing within the manholes/handholes.

Furthermore—as we have now discovered and disclosed herein—since temperature(s) in manhole(s)/handhole(s) are easily affected by environmental temperature, in most cases the temperature(s) existing in manhole(s)/handhole(s) at a given time are different from temperature(s) determined from buried optical fiber. As we have further now determined, temperature swings from daytime to nighttime for manhole(s)/handhole(s) are larger than buried optical fiber. As a result, the location(s) of manhole(s)/handhole(s) may be advantageously determined from such DTS data.

We now show and describe a deployed mesh/ring/star switched fiber telecommunications structure (test bed) and explore its operation and networking functions as a sensor network. Sensing features, in addition to detecting vehicle traffic, such as detecting acoustic effects and environmental temperatures with the sensor network are disclosed and described.

Figure 2:
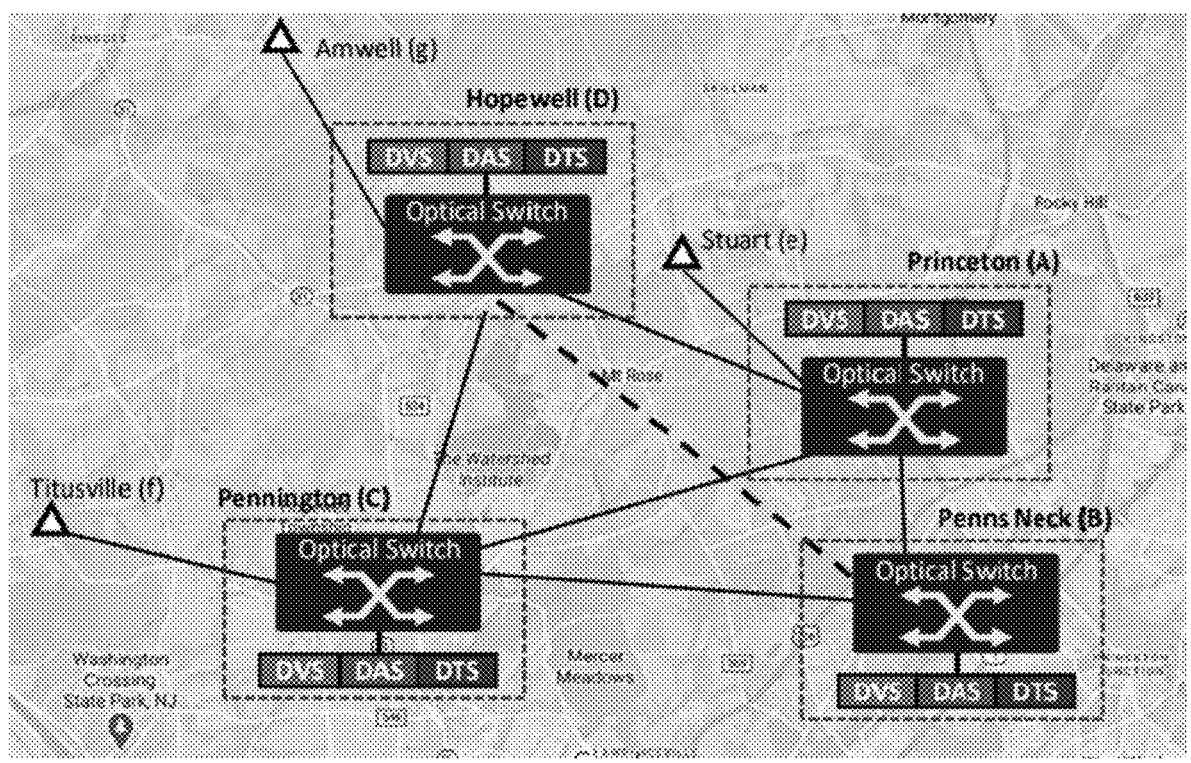
FIG. 2 is a map layout of a distributed, switched sensor network testbed over an existing communications network according to aspects of the present disclosure.

FIG. 2 shows a map of switched optical fiber telecommunications links in a New Jersey area which include central offices (CO) and fiber branches. The testbed shown in the figure covers four COs at Princeton, Penns Neck, Pennington, and Hopewell (see, FIGS. 2(A)-(D)) and three spur routes (FIG. 2(e)-(g)) with section length of 4.5 km-17.2 km. The optical fiber is located in a fiber cable either buried underground or aerial—hanging on poles.

The distributed fiber optical sensing (DFOS) technologies used are distributed vibration/acoustic/temperature (DVS/DAS/DTS) sensing. By leveraging Rayleigh and Raman backscattering effects, any related dynamics can be sensed at every point along an optical fiber. Temperature sensing is based on Raman OTDR technologies. Vibration sensing measures the change in intensity of Rayleigh scattering via interferometric phase beating in the fiber. By detecting relative phase shift(s) of the reflectance of coherent Rayleigh scattering light wave(s), the dynamic strain information may be retrieved as acoustic sensing. DFOS advantageously employs short optical pulses along with on-chip fast processing to enable an equivalent sensor resolution as small as 1 meter.

Optical switches (SW) having a switching time, 10 ms are employed in 3 COs to realize the ring, mesh, star, and flexible networks evaluated. For Example, a ring network is realized from (A)-(D)-(C)-(A), while fiber branch (g) is carrying out from (A)-(D)-(g) by the SW in the Hopewell CO. With an additional fiber link from (B) to (D), a full meshed network can be implemented by the same architecture. Hence, DFOS systems can be located in any CO to detect multiple environmental features which further supports our submission that systems, methods, and structures according to the present disclosure will enable smart city/community applications.

Vehicle Traffic Detection with a Ring Topology

Figure 3A:
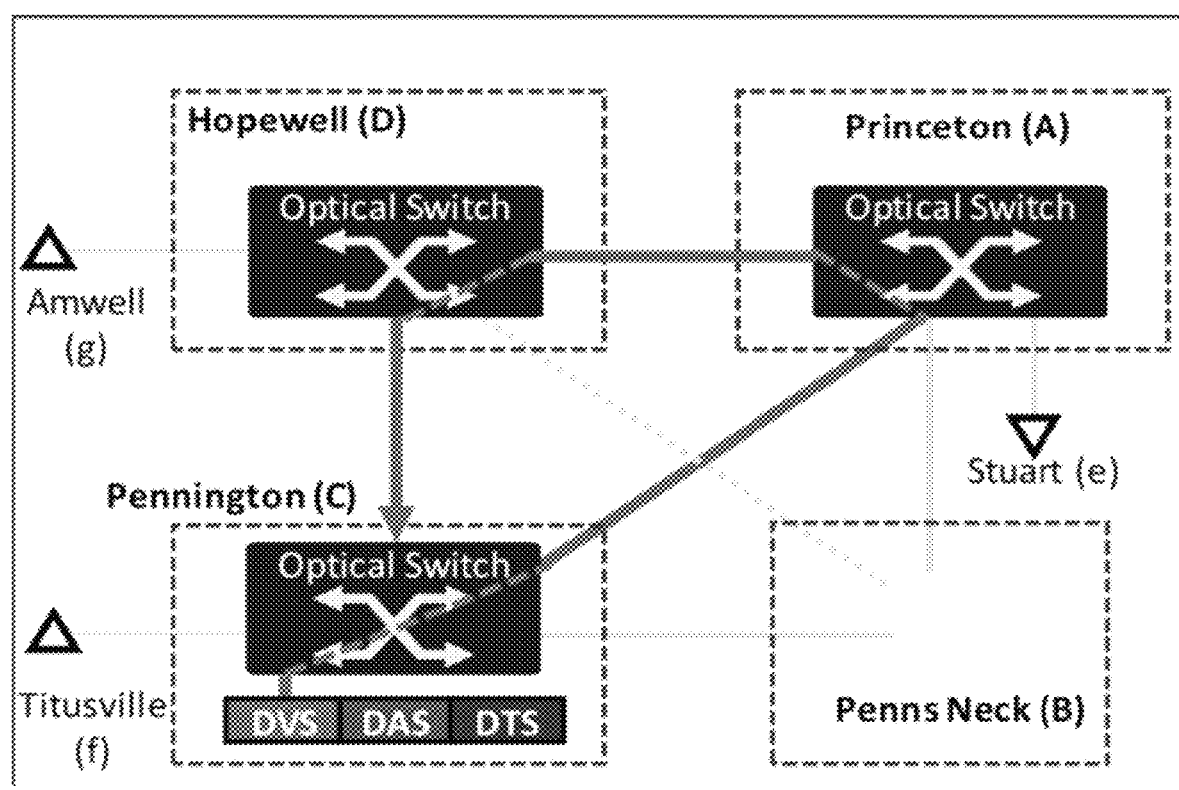
FIG. 3(A) is an architecture layout of a distributed switched sensor network testbed in a ring network topology over an existing communications network and FIG. 3(B) is a series of waterfall trace plots showing vehicle traffic detection in the ring network of FIG. 3(A) according to aspects of the present disclosure.

FIG. 3(A) shows a test network setup having a ring network topology using DVS to detect vehicle traffic. To achieve the ring topology, sensing signals were traveling over optical paths from (C)-(A)-(D)-(C) by SWs.

Figure 3B:
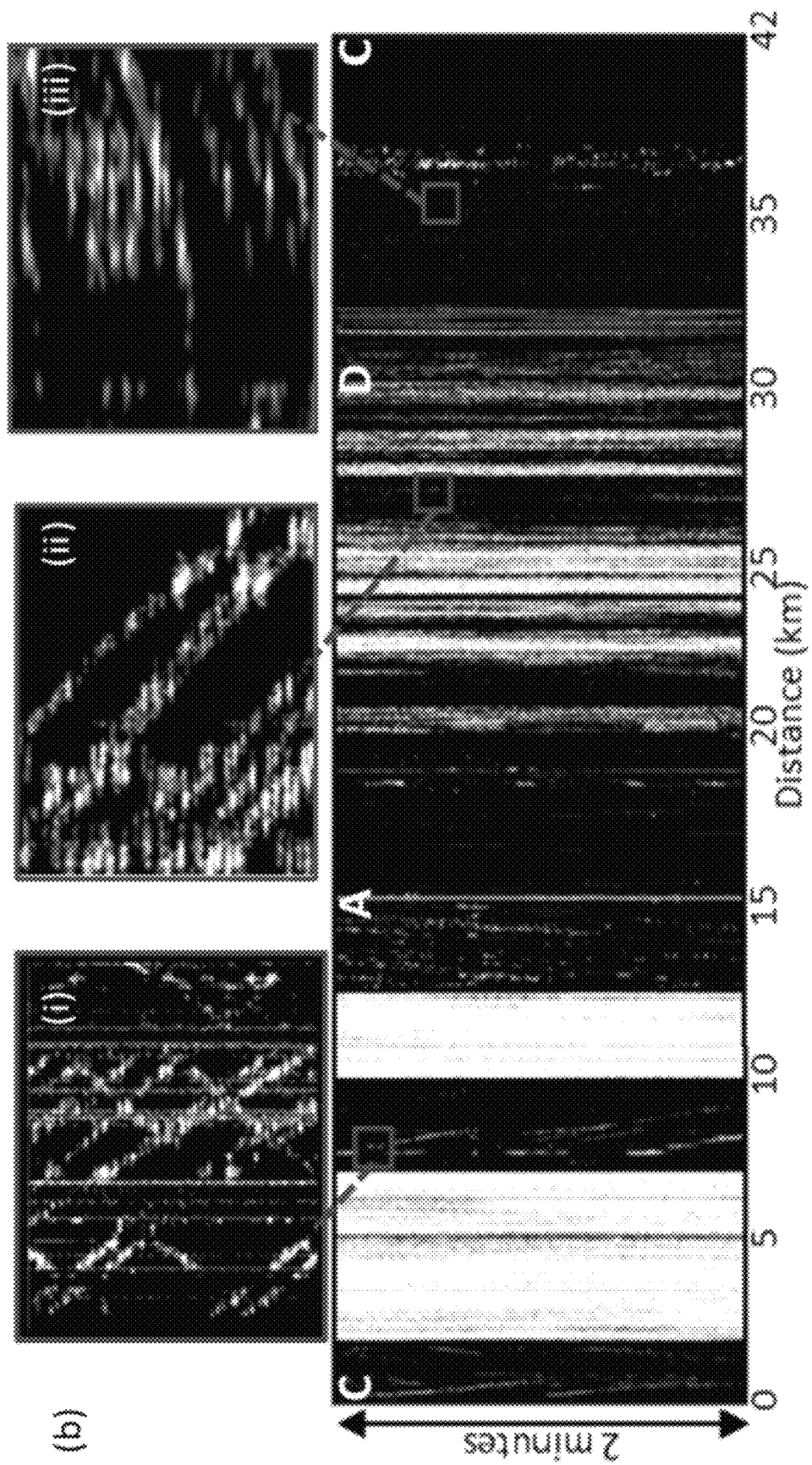

FIG. 3(B) exhibits a typical waterfall trace captured from DVS system showing ambient vibration intensity in a 2-minute window (vertical axis) and location (horizontal axis), with 41.8 km total distance of the ring network. A few vertical sections exhibiting high intensity signals represent aerial cables while low intensity areas represent buried cables. We note that detected vibrations were likely the result of vibrations generated by wind on aerial cables. In order to visualize vehicle traffic patterns, enlarged waterfall traces are inserted in frames (i)-(iii).

Vehicle Traffic Detection with a Meshed Topology

Figure 4A:
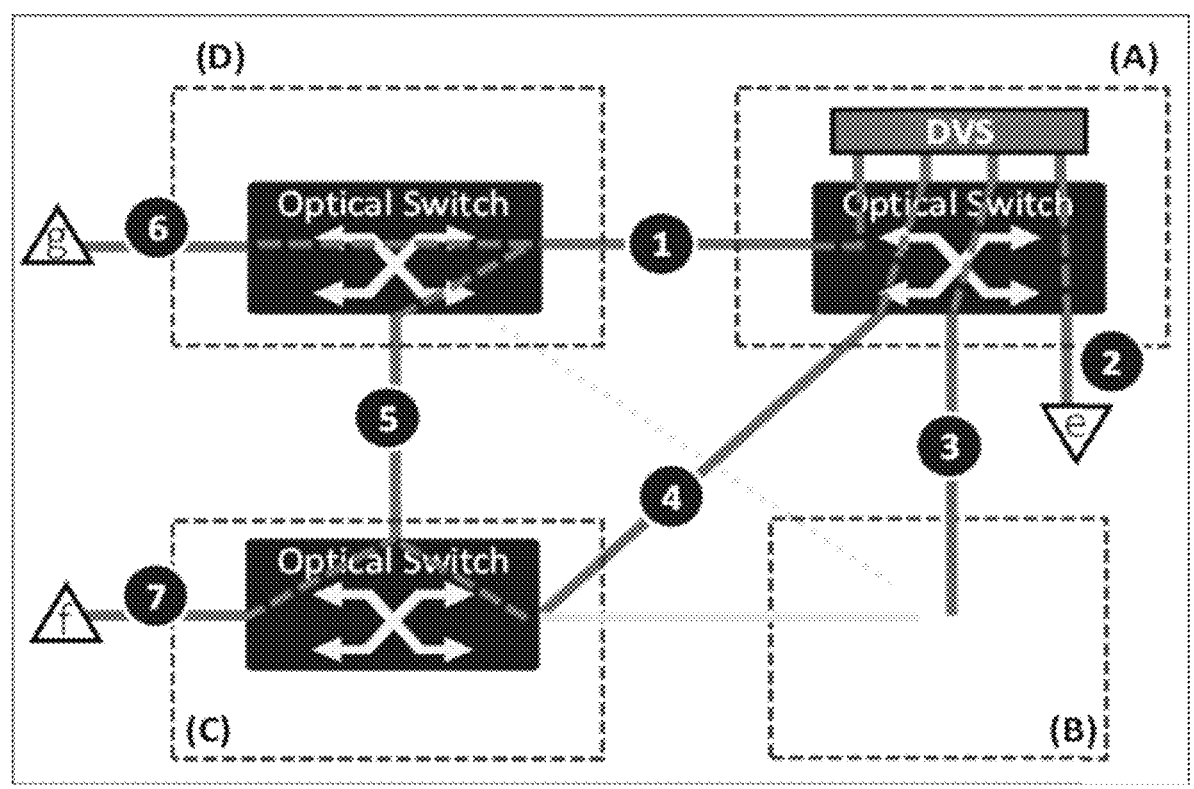

FIG. 4(A) shows a 4-channel DVS system in a semi-mesh topology used to detect environmental vibrations. To realize the meshed network, a SW in different COs was used to route switching to achieve route 1-7. As an example, it was switched from (A)-(D)-(g) to obtain route 6 and (A)-(D)-(C) to obtain route 5.

Figure 4B:
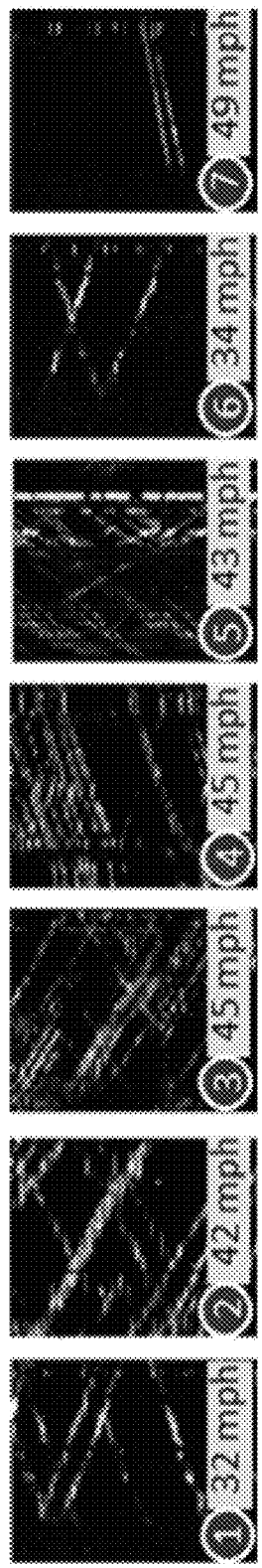
Figure 4C:
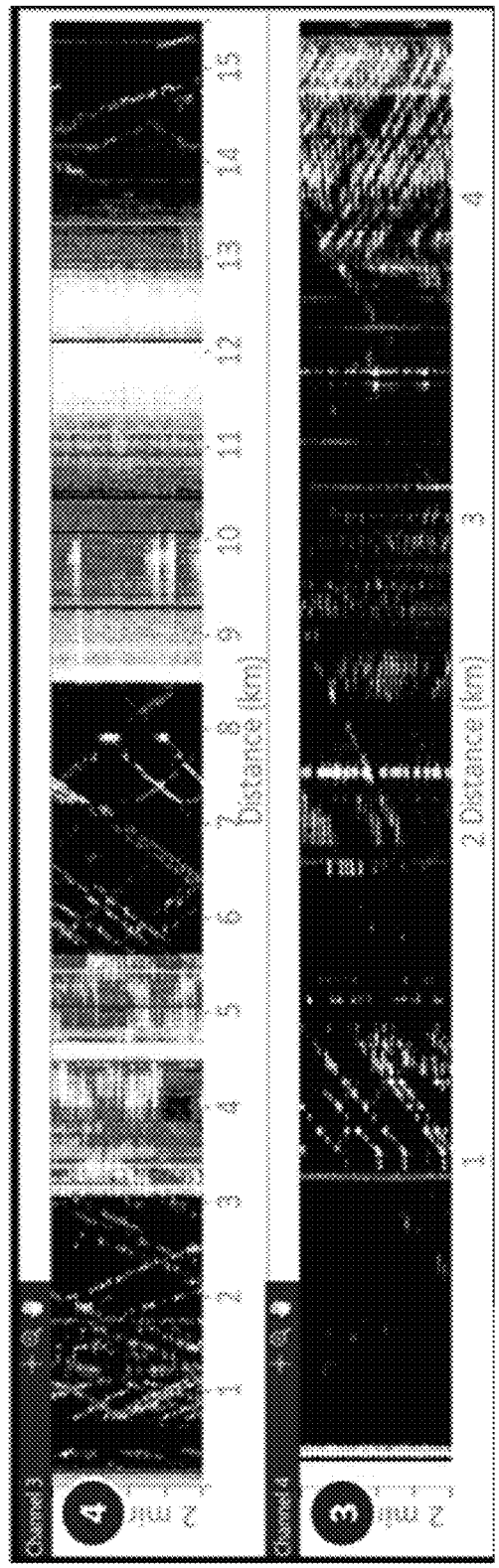
FIG. 4(C) illustrates 4-channel DVS detection of routes simultaneously, all according to aspects of the present disclosure.

FIG. 4(B) shows waterfall traces in a selected 1-km window for 7 routes. It shows the traffic patterns in 2 minutes and average vehicle speed. A newly developed 4-channel DVS has been deployed in this experimental study with multiple-route monitoring simultaneously. FIG. 4(C) shows a 2-channel result as an example for route 4 and 3.

Environmental Temperature with a Star Topology

Figure 5A:
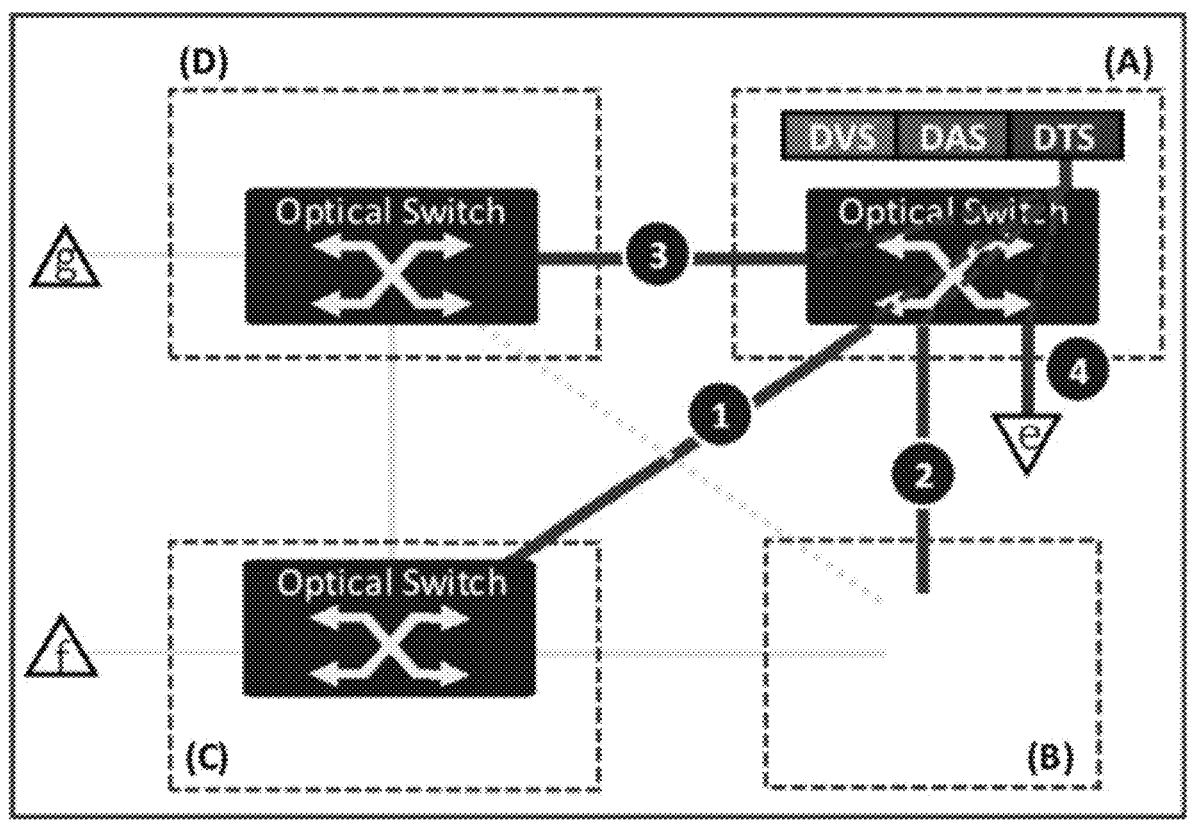
FIG. 5(A) is an architecture layout of a distributed switched sensor network testbed in a star network topology over an existing communications network and FIG. 5(B) is a series of temperature plots showing overnight temperature variations in the star network of FIG. 5(A) according to aspects of the present disclosure.
Figure 5B:
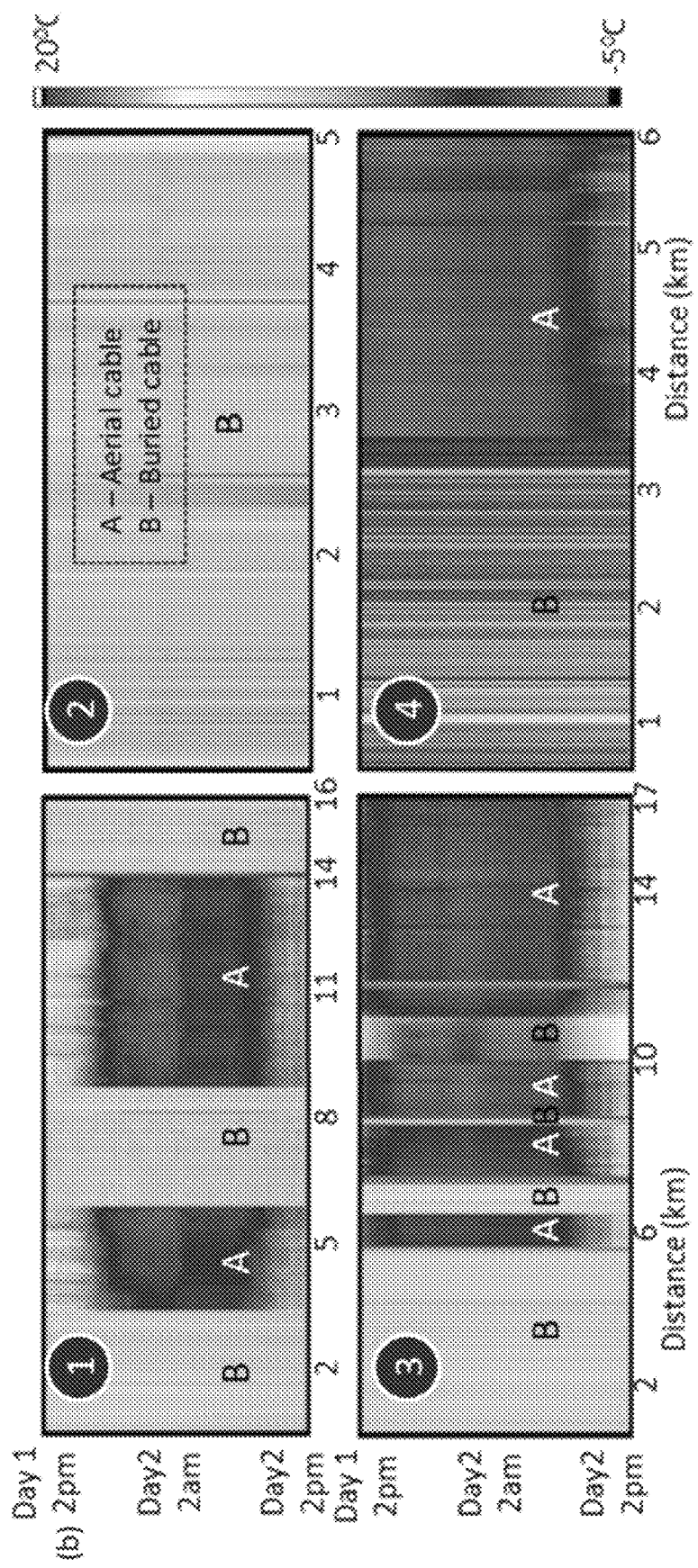

FIG. 5(A) shows sensing systems setup in a star topology to detect environmental temperatures by DTS. To achieve a star network, the sensing paths included (A)-(C), (A)-(B), (A)-(D) and (A)-(e) by the SW to detect temperatures of route 1-4. Continuous 24-hour temperature measurement is shown in FIG. 5(B). It is clear to distinguish locations of the cable as hanging on poles or buried underground. Sections "A" in FIG. 5(B) represent aerial cables based on large day and night temperature difference. For underground cables, the temperature is more stable as sections "B". Especially for route 2, entire fiber cable is buried underground. The average underground temperature in mid-February is ~10° C. and ~0° C. for ambient during midnight. With our disclosed, proposed architecture(s), more localized temperature information can be provided by existing fiber infrastructures.

Flexible Network Topology

Figure 6A:
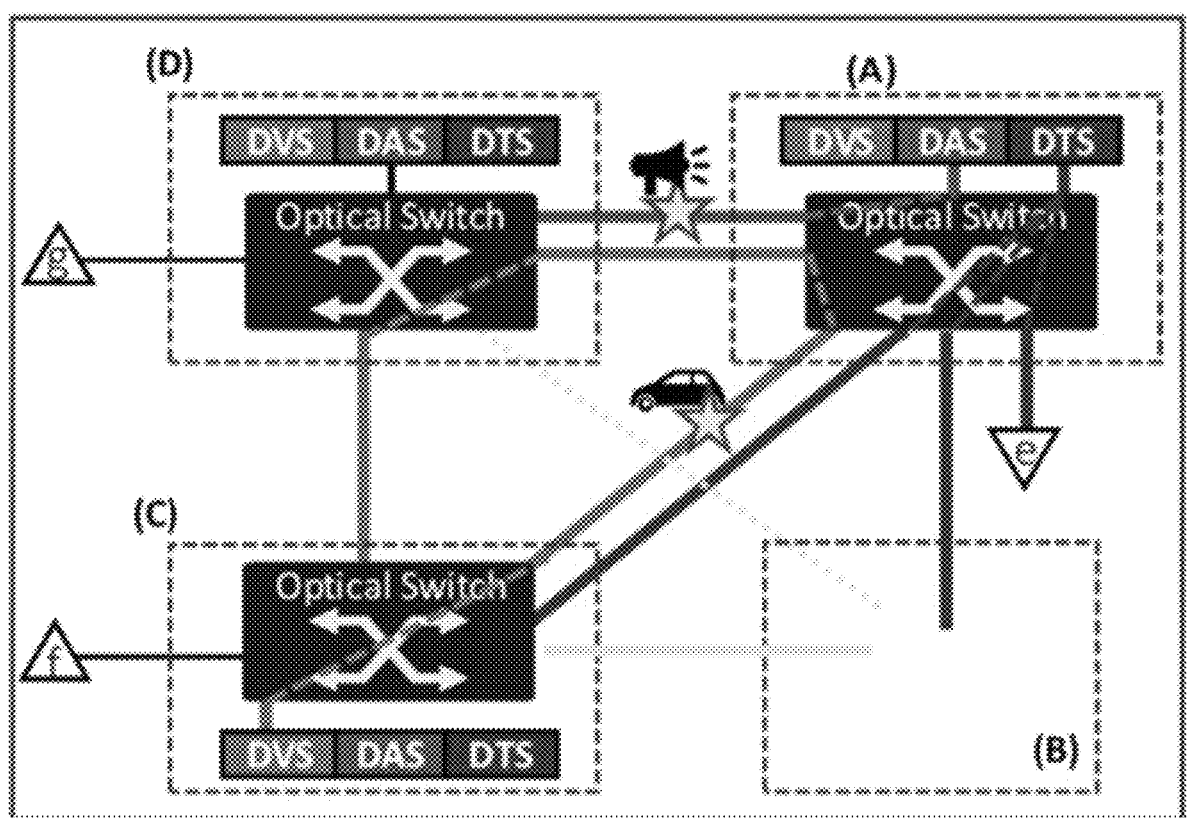

A flexible network is realized in this field trial with multiple DFOS systems and SWs. FIG. 6(A) illustrates a topology for a flexible network having acoustic, vibration and temperature sensing, capabilities. Any location within the network with respect to any environmental effect(s) can advantageously be detected.

Figure 6B:
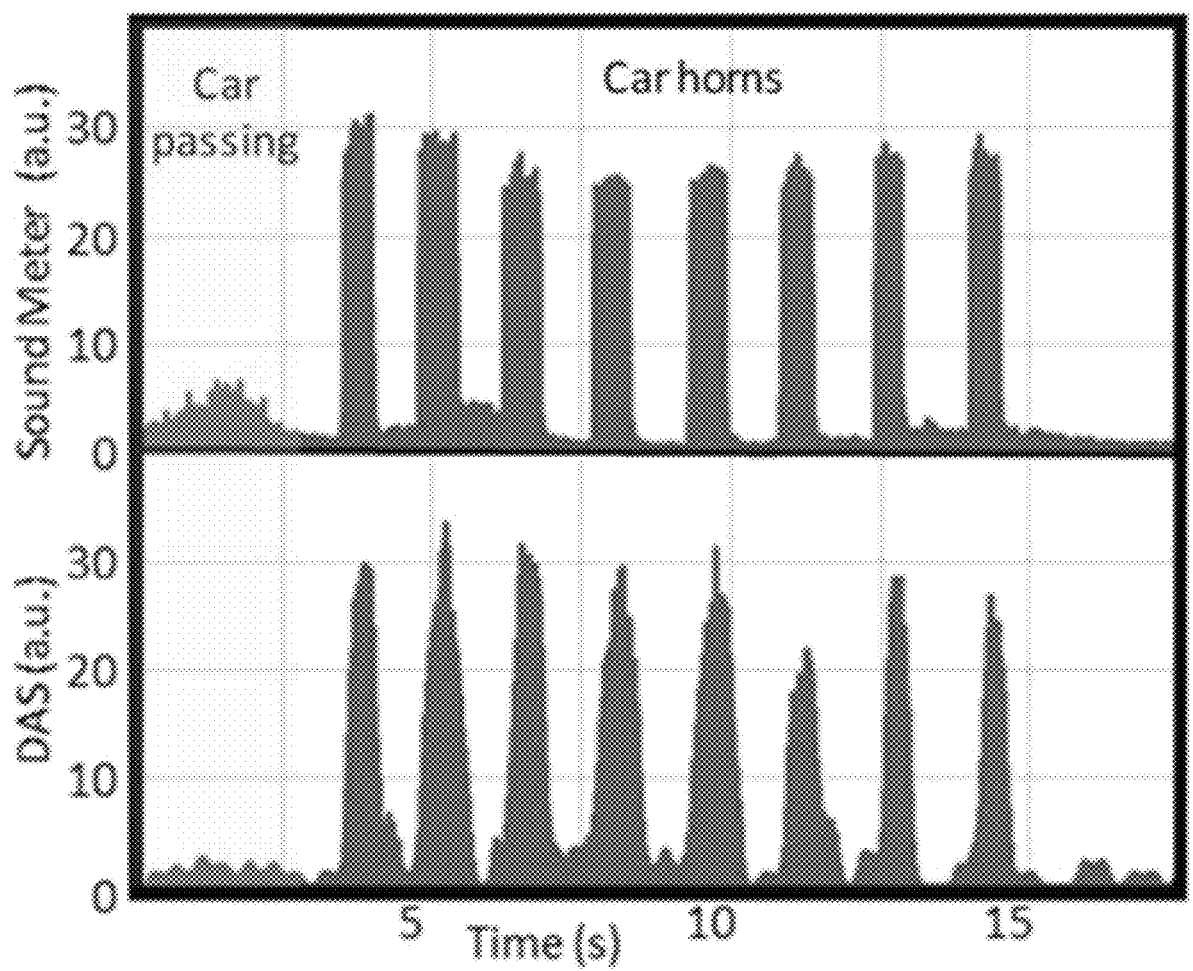

By way of example, a car horn and traffic monitoring in different routes are illustrated. FIG. 6(B) shows received field acoustic effects from passing vehicles and 8 consecutive car horns. The upper one shows amplitude detection by a commercial sound meter and received signals by a DAS system through the down-lead fiber on a pole is shown in a lower one. It can be seen that the sensing system is capable of catching and playing back the sound events in the field.

Figure 6C:
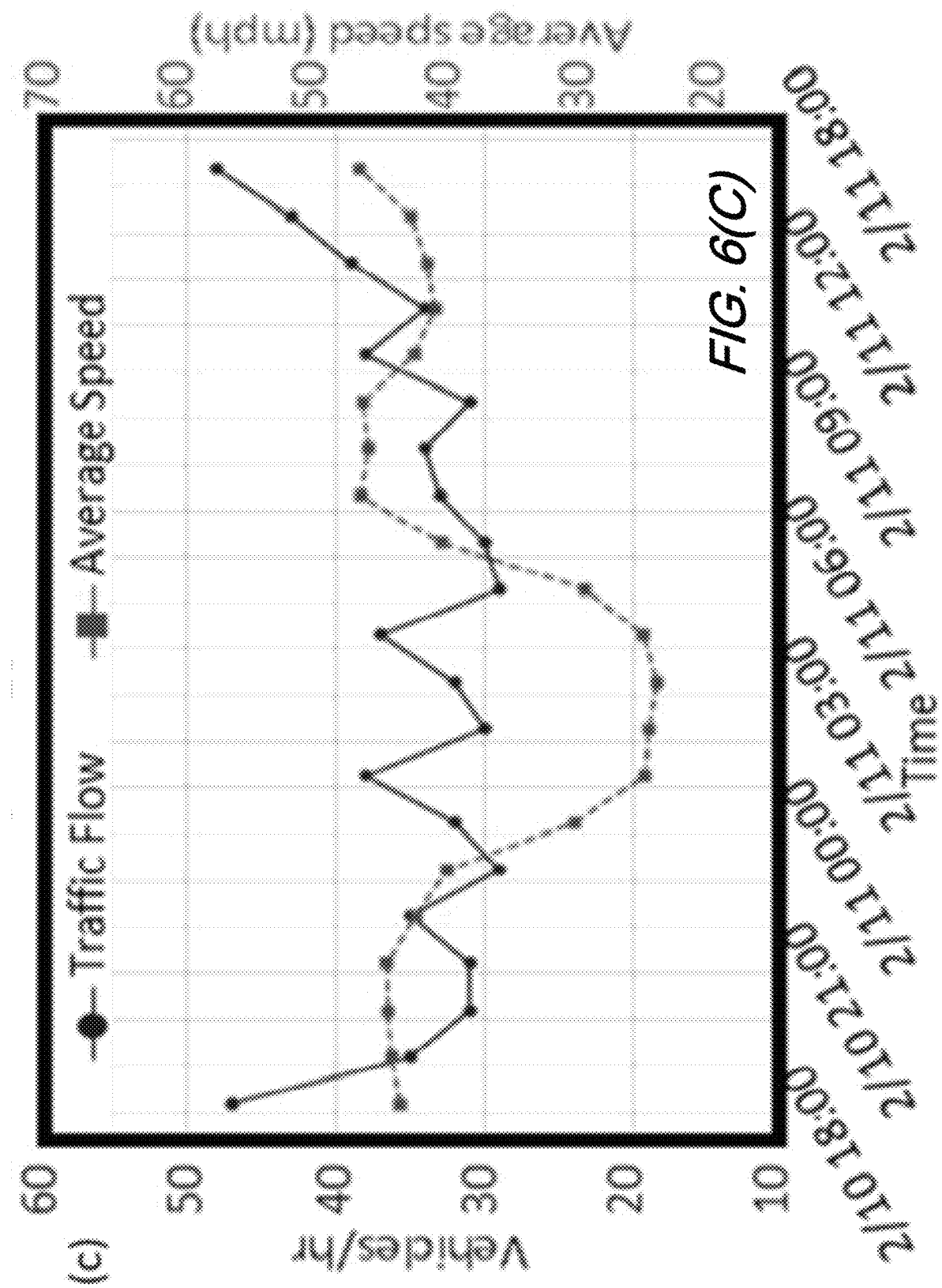
FIG. 6(C) is a graph showing traffic monitoring in the flexible network of FIG. 6(A) according to aspects of the present disclosure.

FIG. 6(C) illustrates a 24-hour traffic monitoring including vehicle accounting and average speed estimation. The selected section is on a major road from northwest to the campus of Princeton University.

We note once again that we have described and demonstrated the first sensing network on operational, live network, high data rate, telecommunications networks. By leveraging Rayleigh and Raman backscattering, any related physical properties, such as vibration, temperature and acoustic effects can be sensed at every point along the entire fiber cable. Employing multiple DFOS systems and optical switches, network-wise sensing features including star, ring, mesh, and flexible topology are disclosed and evaluated. Moreover, a newly developed 4-channel DFOS system is implemented and successfully detects multiple routes simultaneously. Advantageously, systems, methods, and structures according to aspects of the present disclosure may advantageously permit city traffic monitoring to applied on future road design and traffic signal planning. Environmental temperature monitoring can be used for micro-temperature measurement providing more localized temperature information comparison to weather stations.

While we have presented this disclosure using some specific examples, those skilled in the art will recognize that our teachings are not so limited. Accordingly, this disclosure should be only limited by the scope of the claims attached hereto.

The invention claimed is:

1. An optical fiber network comprising:
a single optical fiber in optical communication with one or more optical switches;
the optical fiber network CHARACTERIZED IN THAT:
multiple, switched distributed fiber optic sensing (DFOS) signals and switched optical fiber telecommunications signals simultaneously coexist on the single optical fiber.

2. The optical fiber network of claim 1 FURTHER CHARACTERIZED IN THAT:
the DFOS signals are ones selected from the group consisting of distributed vibration sensing, distributed temperature sensing, distributed strain sensing, and distributed acoustic sensing.

3. The optical fiber network of claim 1 FURTHER CHARACTERIZED IN THAT:
the telecommunications signals convey telecommunications data modulated by a format selected from the group consisting of quadrature phase shift keying (QPSK), quadrature amplitude modulation (QAM), and orthogonal frequency division multiplexed (OFDM).

4. The optical fiber network of claim 1 FURTHER CHARACTERIZED IN THAT:
the topology of the switched optical fiber network is one selected from the group consisting of star, ring, mesh, and flexible topology.

5. The optical fiber network of claim 1 FURTHER CHARACTERIZED IN THAT:
more than one type of DFOS sensor is in optical communication with the single optical fiber at any time.

6. The optical fiber network of claim 2 FURTHER CHARACTERIZED IN THAT:
one or more multi-channel interrogators provides the sensing pulses and receives the backscattered light.

7. The optical fiber network of claim 6 FURTHER CHARACTERIZED IN THAT:
the optical network includes multiple independent routes, each route including at least one optical fiber span, wherein one or more of the multiple independent routes simultaneously carry DFOS signals and telecommunications signals.

8. The optical fiber network of claim 7 FURTHER CHARACTERIZED IN THAT:
the one or more multi-channel interrogators provides sensing pulses and receives backscattered light from multiple, different sensor types concurrently.

9. A method of upgrading a switched optical telecommunications network comprising:
providing the switched optical telecommunications network, the switched optical communications network comprising:
a plurality of optical fibers in optical communication with one another via one or more optical switches such that the optical fiber network exhibits a topology selected from the group consisting of: ring, star, and network; and
a pair of transceivers, one at each end of, and optically coupled to at least one of the plurality of optical fibers;
the network configured to convey telecommunications traffic over the plurality of optical fibers;
the method of upgrading comprising:
providing a distributed fiber optic sensing (DFOS) system to operate over the switched optical telecommunications network;
wherein the DFOS system operates simultaneously with the conveyance of the telecommunications traffic over the telecommunications network; and
wherein multiple distributed fiber optic sensing (DFOS) signals and switched optical fiber telecommunications signals simultaneously coexist on a same single optical fiber of the plurality of optical fibers.

* * * * *